US008404071B2

United States Patent
Cope et al.

(10) Patent No.: US 8,404,071 B2
(45) Date of Patent: Mar. 26, 2013

(54) RAPID FILM BONDING USING PATTERN PRINTED ADHESIVE

(75) Inventors: Dennis Allen Cope, Crossville, TN (US); Thomas Charles Brough, High Point, NC (US)

(73) Assignee: RadPax, Inc., Shelby, NC (US)

( * ) Notice: Subject to any disclaimer, the term of this patent is extended or adjusted under 35 U.S.C. 154(b) by 829 days.

(21) Appl. No.: 12/293,034

(22) PCT Filed: Mar. 16, 2007

(86) PCT No.: PCT/US2007/006674
§ 371 (c)(1),
(2), (4) Date: Jan. 7, 2009

(87) PCT Pub. No.: WO2007/109153
PCT Pub. Date: Sep. 7, 2007

(65) Prior Publication Data
US 2009/0221408 A1 Sep. 3, 2009

Related U.S. Application Data

(60) Provisional application No. 60/783,333, filed on Mar. 16, 2006.

(51) Int. Cl.
*B31B 1/90* (2006.01)
*B31B 1/60* (2006.01)
(52) U.S. Cl. .................... 156/272.2; 493/264
(58) Field of Classification Search .......... 156/272.2, 156/272.6, 275.5, 275.7, 277, 290, 291; 493/264, 493/266
See application file for complete search history.

(56) References Cited

U.S. PATENT DOCUMENTS

| | | | |
|---|---|---|---|
| 4,849,040 A * | 7/1989 | Wood | 156/204 |
| 5,165,799 A | 11/1992 | Wood | 383/8 |
| 5,254,074 A | 10/1993 | Landers et al. | 493/213 |
| 6,015,047 A | 1/2000 | Greenland | 206/522 |
| 2004/0043167 A1* | 3/2004 | Holzem et al. | 428/34.9 |
| 2004/0058603 A1 | 3/2004 | Hayes | 442/286 |
| 2004/0138325 A1* | 7/2004 | Yamaguchi et al. | 522/71 |
| 2005/0100251 A1* | 5/2005 | Havens et al. | 383/107 |
| 2005/0287324 A1* | 12/2005 | Rea et al. | 428/35.7 |
| 2006/0194004 A1* | 8/2006 | Niemoller et al. | 428/32.11 |
| 2006/0210738 A1 | 9/2006 | Slovencik et al. | 428/35.2 |

OTHER PUBLICATIONS

International Search Report and Written Opinion From Corresponding PCT Application No. PCT/US2007/006674, Mar. 4, 2008 (10 pgs).
U.S. Appl. No. 29/225,860 (priority document for US 2006/0210738), Patent Application (38 pgs) and Ex Parte Quayle Action (14 pgs).

* cited by examiner

*Primary Examiner* — Daniel McNally
(74) *Attorney, Agent, or Firm* — Kevin E. Flynn; Flynn IP Law

(57) ABSTRACT

Various processes for the creation of a film to film bond using printed patterns of adhesive traces. In some implementations of the process, control of the process including control of the temperature of the adhesive and film to a temperature approaching the heat distortion temperature for the film will vary the strength of the bond from a frangible bond to a bond the tears the film, (a film-tearing bond). Some implementations of the process may be used to produce bonded films at web speed rates that are significantly higher than commercial rates for heat seal processes.

22 Claims, 1 Drawing Sheet

RAPID FILM BONDING USING PATTERN PRINTED ADHESIVE

This application claims priority to and incorporates by reference herein, co-pending United State Provisional Patent Application No. 60/783,333 filed Mar. 16, 2006.

FIELD OF THE INVENTION

The present invention makes a contribution to the field of packaging. More specifically, the present invention makes a contribution to packaging such as flexible containers, sacks, bags, protective/inflatable packaging by providing a method to selectively impose a pattern of adhesive bonds that form hermetic seals to hold gases, solids or fluids.

BACKGROUND OF THE INVENTION

Currently the most common method of manufacturing flexible containers uses heat sealing or welding together of films or sheets as the joining method. Heat sealing of plastic film has three components: 1) Heat: sufficient to melt plastic layers to fuse; 2) Pressure: Sufficient to ensure a good seal; and 3) Dwell Time: sufficient time for the heat and pressure to be applied to material to achieve seal. Beyond dwell time, it takes more time for the heat sealed area to cool enough to become solid. Heat seals are usually produced by "radiant", "impulse" or "inductive" methods. Methods of producing heat seals range from manual to fully automatic either in an "intermittent" (start/stop) or continuous motion (rotary or moving platen) Production rates of heat sealing are in the range of 100 to 135 feet of film per minute. This production rate has not obtained significant increases in speed for many years.

There are a number of processes that create roll stock at a factory using factory bonds to partially construct a flexible container while leaving one or more bonds (user bonds) to be completed by the user after the flexible container has been filled. One of the advantages of this two step (factory/user) sealing process is that shipment of roll stock rather than completed products is more efficient in that a relatively small volume of roll stock can contain the film necessary to create a very large volume of finished product. Given the distribution of companies with heat seal equipment that is used to make the final user bonds, it is desirable that new processes be compatible with heat sealing so that user bonds may be added using conventional heat sealing equipment.

One type of bond that is particularly useful is a hermetic seal bond. Such a bond is sufficient to prevent the migration of solids, liquids, and gases across the bond under normal operating conditions. Thus, a bond between two adjacent layers of film would be a hermetic seal bond if gas cannot pass through the bond to move from one side of the bond to the other side of the bond. To the extent that the product receives a user bond after filling at the user's location, the factory bonds may not fully encircle an area to form a closed volume so that volume is not yet hermetically sealed although portions of the perimeter of the volume have hermetic seal bonds.

SUMMARY

This disclosure describes various processes for the creation of a film to film bond using printed patterns of adhesive traces. In some implementations of the process, control of the process including control of the temperature of the adhesive and film to a temperature approaching the heat distortion temperature for the film will vary the strength of the bond from a frangible bond to a bond the tears the film, (a film-tearing bond). Some implementations of the process may be used to produce bonded films at web speed rates that are significantly higher than commercial rates for heat seal processes.

The bonds created with adhesive may be suitable for use as a hermetic seal and may be used in hybrid products that include a heat seal applied across a portion of the adhesive seal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views. The figures are created and used in order to convey concepts relevant to the present disclosure. The figures are not necessarily to scale. Diagrams highlight relevant components and do not necessarily show all relevant components (for example, power supplies and control systems which may be essential for operation are not described unless they are relevant to a point of novelty).

DETAILED DESCRIPTION

Figure 1:
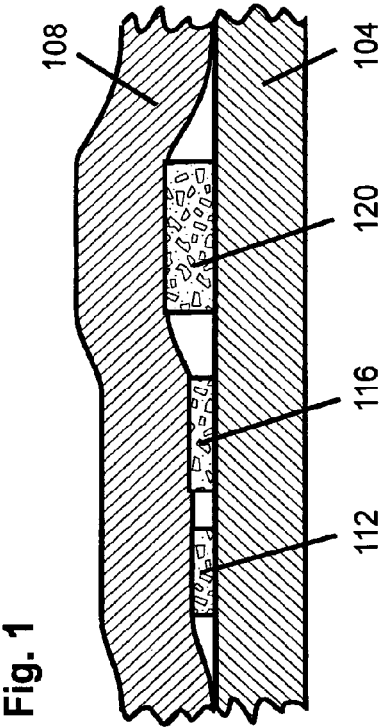
FIG. 1 is a cross section of two adhesive bonded films 104 and 108.

FIG. 1 introduces a series of concepts that are useful for understanding the rest of this document. FIG. 1 shows a cross section of two adhesive bonded films 104 and 108. Film 104 is the substrate film sometimes called the face substrate film. A set of lines of adhesive 112, 116, 120, (patterned adhesive traces) were added to the substrate film 104 before the laminate film 108 was added and the adhesive was cured (as discussed below some processes partially cure the adhesive before the laminate is added).

Patterned adhesive traces 112 and 116 have a similar coating weight and this is less than the coating weight for adhesive trace 120. Adhesive lines 112 and 116 while having a similar coating weight have different trace widths. For example, patterned adhesive trace 112 might have a trace width of one eighth of an inch and patterned adhesive trace 116 might have a trace width of one quarter of an inch.

Given sufficient loading, a bond will break. Thus, in this light, all permanent bonds are destructive bonds as something is destroyed when the bond gives way. (Permanent bonds excludes the re-sealable bonds used for containers meant to be opened and closed again.) In some instances the material in the adhesive itself breaks due to a lack of cohesion. In some instances the failure might come at the interface between the adhesive and the film. This might occur if the film was not sufficiently wettable or if there was a contaminant of some sort so that the adhesive did not penetrate into the surface of the film. In yet other cases, the adhesive is so well bonded to the film on both sides and has sufficient internal cohesion so that the point of failure is the film itself. This type of bond can be deemed a film-tearing bond as the film tears before the bond gives way. Another type of bond is a frangible bond. A frangible bond is one that breaks without tearing the film. While a frangible bond breaks before the higher strength film tearing bonds, this may be desirable in that the frangible bond can break without destroying the integrity of the package. For example, in packaging material with a series of quilted chambers, the bonds at the outer seams may be film-tearing bonds in order to impose the strongest possible bonds but the bonds defining the quilted chambers within the packaging material may be frangible bonds so that under a sudden force, some of the frangible bonds may yield without allowing the gas within the quilted packaging material to leave the packaging material. Such failures of the frangible bonds will decrease the effectiveness of the packaging material but only partially as the gas is retained within the space between the two films.

Figure 2:
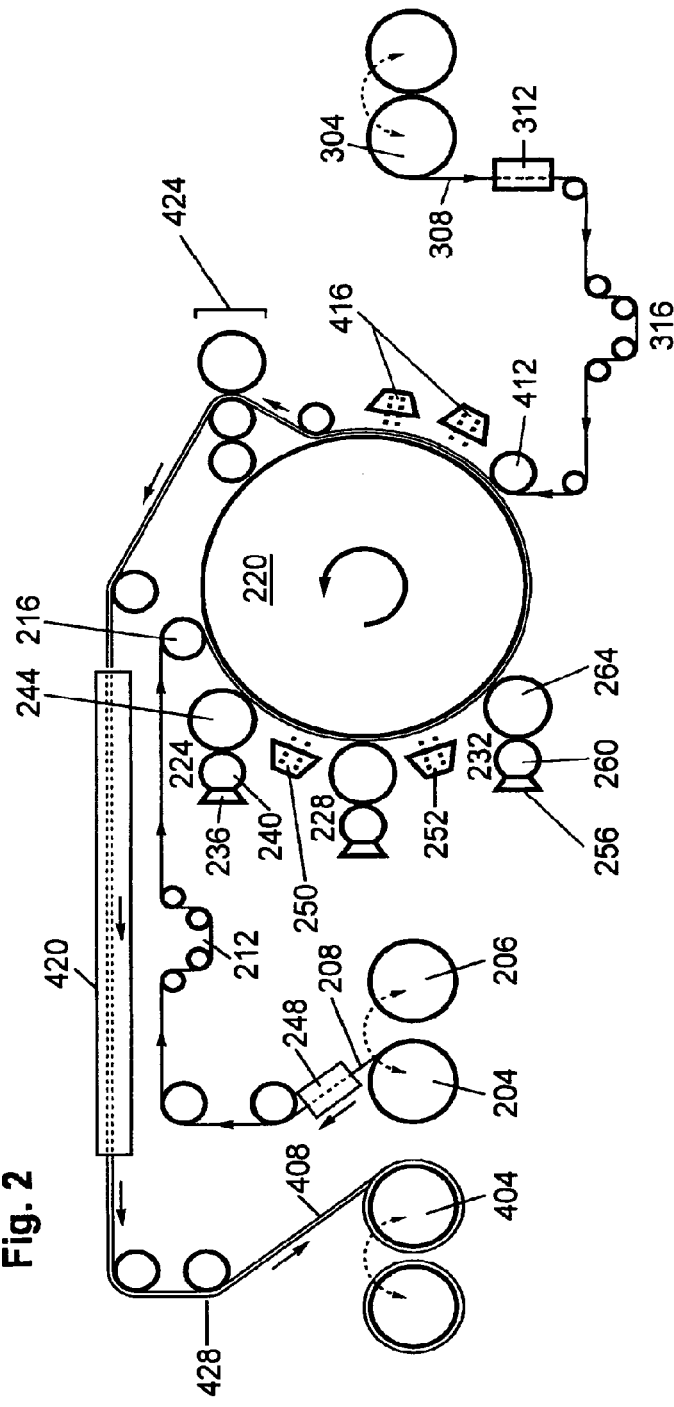
FIG. 2 is a diagram of printing equipment that may be used to apply a printed pattern of adhesive and then cure the adhesive to produce bonds to bind together two layers of film.

FIG. 2 illustrates an arrangement of printing equipment that may be used to apply a printed pattern of adhesive and then cure the adhesive to produce bonds to bind together two layers of film. In contrast to the prior art heat sealing processes which operated in the range of 100 feet of web per minute, equipment of the type shown in FIG. 2 may be operated at speeds of 300 to 800 feet of web per minute or perhaps even faster. In the context of this application and the claims that follow, the term high-speed means in excess of approximately 300 feet of web per minute.

To provide context, it is useful to note that roll 204 provides the substrate film 208 which is bonded to laminate film 308 from roll 304 to form bonded film pair 408 which is re-wound onto roll 404.

More specifically, roll 204 holds substrate film 208 which in this example has been treated to increase wettability. Typically, pretreatment is done on just one side of the film. While traditional printing processes will pre-treat the surface that will be on the exterior of the bonded film pair 408 so that printed material can be added to the exterior of the bonded film pair, for this process, the side of the substrate film that will receive the adhesive and thus be on the inside of the bonded film pair is the one that has received the pretreatment. Pre-treatments to increase wettability include Corona treatment, plasma treatment, flame treatment, and chemical treatments. Pre-treatment may alter the surface energy of the treated side of the film to about 38-42 dynes/centimeter or possibly to 42 to 44 dynes/centimeter. Treatment far in excess of 44 dyne/centimeter may impede the ability to impose a heat seal if such a step is desired. Over-treatment beyond 44 dynes/centimeter might also cause blocking issues for the film (varies from film to film).

Roll 206 is a second roll with treated substrate film 208. Roll 206 is shown here as a part of an automatic splice unwind station such as a Martin Automatic Unwind. Such a unit is desirable in order to allow for efficient transitions from one roll of treated substrate film 208 to the other roll of treated substrate film 208. As automatic splice unwind and rewind stations are known in the art, they will not be described in further detail.

Web guide 212 is used to maintain the position and tension on the substrate film 208. At entry nip roll 216, the substrate film 208 is put in contact with a temperature controlled common impression cylinder 220. In many printing processes, the common impression cylinder is connected to equipment to chill the contents of the cylinder (such as water or oil) in order to remove heat from the film and keep the film chilled so that it does not stretch or break.

However, as described below, one implementation of the process seeks to have the bonding process completed at below but relatively close to the heat distortion temperature for the film. The heat distortion temperature for a type of polymer may be a range as particular attributes of the polymer may alter the heat distortion temperature. For example, for a given type of polymer (such as low density polyethylene (LDPE) or linear low density polyethylene (LLDPE)) the heat distortion temperature may be in the range of 104 to 111 degrees Fahrenheit. Assuming for the particular film used for the substrate film 208, the heat distortion temperature is 110 Fahrenheit, the common impression cylinder 220 may have oil maintained in the cylinder at 90 degrees Fahrenheit. As the common impression cylinder 220 is a very large thermal mass relative to the thin films, maintaining the temperature of the oil in the common impression cylinder is a very effective way of imposing a temperature on the films. For example, the common impression cylinder 220 may have a diameter on the order of magnitude of 8 feet and may have a roller width of 45 inches.

The common impression cylinder has three printing stations 224, 228, and 232. At print station 224, a special type of reservoir of a UV (ultra-violet) curable ink known as an enclosed doctor blade chamber 236 is in contact with an anilox roller 240 which imparts ink to rotary printing plate 244 so that the image of the printing plate is transferred to the pre-treated side of the substrate film 208. This printing process uses a flexographic plate patterned with high and low areas to transfer the desired pattern. The high areas will make contact with the substrate film while the low areas will not.

While the substrate film 208 was pre-treated to enhance wettability, the system shown in FIG. 2 includes a supplemental treatment stage 248 to augment the pre-treatment. This supplemental treatment stage 248 may be a Corona treatment stage. The Corona treatment will enhance the wettability of the treated surface of the substrate film 208 and may be used to address various impediments to good transfer of ink and adhesive such as surface concentrations to un-polymerized material, additives that have migrated to the surface, minor surface contaminants and other impediments. The supplemental treatment stage 248 may be adjusted to provide a post-treatment surface energy of at least 40 dynes/centimeter and preferably 42 dynes/centimeter. Treatment far in excess of 42 dynes/centimeter may cause problems with blocking and may impede the ability to impose a heat seal bond.

After the UV curable ink is applied at print station 224, the ink passes under a UV curing stage 250 so that the ink substantially cures.

The process is repeated at print station 228 and UV curing stage 252 so that a second color of UV curable ink is applied. One of ordinary skill in the art will appreciate that additional print stations may be used to apply addition colors of ink or other treatments to the substrate film 208.

When using a cationic UV curable adhesive (as discussed below), it is preferable to avoid placing the adhesive on water-based or solvent based inks that are not fully cured. The use of UV curable inks followed by curing stations avoids this potential problem.

At print station 232, the reservoir 256 contains a UV curable adhesive rather than another color of ink. The UV curable adhesive is picked up by fountain roller 260 and a pattern of adhesive is printed on to the substrate film 208 by rotary printing plate 264.

At the same time and moving at the same web speed, laminate film 308 is unwinding from roll 304 (one of two rolls in an automatic unwind station). Laminate film 308 has been pretreated to enhance wettability. Again, the surface that is pretreated is not the surface that will ultimately be on the exterior of the bonded films 408, but on the side that will come in contact with the adhesive and will become the interior of the bonded films 408.

A supplemental treatment stage 312 is used to enhance the wettability of the pretreated laminate film 308 in the same manner and to the same level as discussed in connection with supplemental treatment stage 248.

One of the advantages of using a hard nip is that the curing process for some adhesives is retarded by the presence of oxygen. A hard nip will tend to drive out the air and leave just adhesive and film. The hard nip will assist in promoting the integration of the adhesive with the surface layer of the treated film which works in collaboration with having the film surface treated to promote wettability.

The wet lamination nip 412 may be placed in close proximity (within 5 to 12 inches) of the start of the UV curing stage 416. The UV curing stage 416 may include a series of UV dryer elements. In order for the UV energy to reach the UV curable adhesive, the laminate film 308 must be at least partially translucent to UV energy. In other words, the configuration shown will not be suitable for a laminate film 308 that is opaque to UV energy.

In some applications, the substrate film 208 and the laminate film 308 are not made of the same material. If the desired bonded pair of films 408 will have only one of the two films that is opaque to UV energy, then the opaque film may be used as the substrate and the non-opaque film may be used as the laminate as only the laminate film need be non-opaque since it is not necessary that the UV energy pass through the substrate film.

After at least partial curing from the effects of the UV energy, the bonded pair of films 408 is directed through an optional secondary heater 420 as maintaining the film in a desired thermal proximity to the heat distortion temperature may be used to increase the strength of the bonds. The optional secondary heater 420 may be particularly useful if the printing process is being practiced in a space that is not much cooler than 70 degrees Fahrenheit.

The bonded pair of films 408 is wound onto a roll 404 at the dual re-wind station. The strength of the bond can be enhanced by keeping the roll at ambient temperature of the factory for 24 hours rather than allowing the roll to cool significantly below ambient temperature of the factory by placing the roll in an unheated space.

The bonded pair of films 408 may be treated at a rotary die cutter station 424 to impose perforations into the bonded pair of films 408. A slitter station 428 may be included in the process sequence. The use of a slitter station allows several rolls of finished product to be processed concurrently then slit at the end. For example, if the end product is a 13 inch wide bonded pair of films, then if a substrate film that is 39 inches wide is used with a laminate film that is 39 inches wide on equipment of adequate width to handle that width, then the effective rate of creation of the end product is three times the film speed (web speed) in the process. So a web speed of 500 feet per minute becomes effectively 1500 feet per minute of created end product.

Strength of Bond

One way to vary the strength of the bond from low strength and frangible all the way to a film tearing bond is to control the temperature of the film in the UV curing stage 416. The temperature of the film is a combination of the temperature of the common impression cylinder and the temperature increase from the exothermic chemical reaction of the adhesive curing in response to the exposure to UV energy. For example, if the common impression cylinder 220 is heated to 90 degrees Fahrenheit and the adhesive is applied in a one eighth inch wide trace, the chemical activity with curing the patterned adhesive trace of adhesive may increase the local temperature of the adhesive to 100 degrees Fahrenheit which may produce a frangible bond. A patterned adhesive trace with a width of one quarter inch may increase the local temperature of the adhesive to 108 degrees Fahrenheit which is very close to the heat distortion temperature of 110 degrees Fahrenheit for this film. Curing the adhesive at a temperature this close to the heat distortion temperature will promote the formation of bond that is film tearing rather than frangible. A patterned adhesive trace with a width of a half inch would have too much localized temperature increase to be used with a common impression cylinder 220 at 90 degrees Fahrenheit and a film with a heat distortion temperature of 110 degrees Fahrenheit. If the heat distortion temperature of the substrate film 208 and the laminate film 308 is not the same, the temperature used may approach but should not exceed the lower of the two heat distortion temperatures. Fortunately, the bonding capabilities between the adhesive and film seems to increase with the heat distortion temperature for the film. Thus, operation at close to but not exceeding the film distortion temperature of the lower of the two temperatures provides for a strong bond with that film and the film with a higher heat distortion temperature is often prone to form strong bonds even if the bonds are not formed near the heat distortion temperature for that film.

A second way to alter the bond strength is to vary the coating weight. Turning back to FIG. 1, the coating weight for adhesive trace 120 may be 0.2 to 0.3 mils. The coating weights for patterned adhesive traces 112 and 116 are about half of that. Just as varying the patterned adhesive trace width causes a difference in the temperature of the adhesive during the curing process, changing the coating weight will alter the temperature of the patterned adhesive trace during the curing process and will thus alter the strength of the bond created.

While it may be possible to lay down one set of patterned adhesive traces of a certain coating weight to create frangible bonds and a second set of patterned adhesive traces at a different coating weight to create film-tearing bonds through the use of two print stations applying patterns of adhesive. While this sounds complicated it is possible as only the raised sections of the rotary printing plate make contact with the film so adhesive previously deposited need not be disturbed. However, the printing equipment may not have another print station available for a second adhesive print station and it may be undesirable to reduce the number of print stations used for ink.

Fortunately, there is another method of applying a patterned adhesive trace that has a reduced effective coating weight. The solution is to use the printing process for halftones to apply adhesive with the full coating weight but on only a portion of the space receiving adhesive so that the hard nip against the highly wettable film surfaces causes the adhesive to move from a pattern of full coating weight and no adhesive to a uniform pattern of partial coating weight.

While the name halftone implies that the choice is 100 percent application or 50 percent application of adhesive (percentage based upon the area covered by the adhesive trace), the halftone process has been used in printing to allow a finite number of colors to produce gradations in intensity. For example, through the use of black ink, a halftone process could slowly decrease the frequency of black dots from almost solid black through all the shades of grey down to just shy of pure white. The halftone process could use frequency of the dots, size of the dots, or some combination of the two factors. Thus, through a creative reuse of the halftone process used to create gradations in ink intensity, the halftone process can be used to vary the amount of adhesive applied within the area covered by the adhesive trace so that the post-nip coating weight can be varied with precision.

While the halftone process is often thought of as based on the application of dots, it could be achieved through any number of patterns such as by way of example, the use of a pattern of stars, a fine checkerboard pattern, patterns of square or round spirals, or even the application of a series of square waves of adhesive within the adhesive trace area to receive the adhesive.

Through the use of halftones, the bond strength of a single bond may be varied so that the bond is intentionally weaker at certain points than at others to facilitate or resist the onset of the destruction of the frangible bond at certain places within the pattern of frangible bonds.

Printed material on the exterior of the bonded film pair.

While the process described above is unusual in that it teaches printing on what will become the inside of the bonded film pair 408, there may be occasions where printing on the other side of the film makes sense. In many instances, placing adhesive on top of a previously deposited layer of ink does not lead to the desired bond strength as the adhesive does not make good contact with the film. In some instances the desired product may have a section that receives a coat of ink all the way to the edge of the product which would make it difficult to apply a layer of adhesive near the edge. While one work-around would be to add pigment to the adhesive, the other option would be to obtain film that was pretreated on both faces and use a second common impression cylinder to apply ink from printing stations associated with that common impression cylinder to add ink to the side of the film that will not be part of the bonded interior of the bonded film pair 408. While the ink could be added to the other face of the film either before or after lamination, it is likely that the printing would be added before the addition of adhesive and lamination in order to minimize the risk that the printing process would disturb the placement of the adhesive.

Use of Inherently Wettable Film

Some polymer material, for example nylon, is amply wettable even without the addition of a pretreatment to enhance wettability. Thus, when using such a material, the rolls of film do not need to be pretreated and do not need to have treatment in the supplemental treatment stage. When using nylon, the bond formed with nylon is very strong even if the adhesive does not approach the heat distortion temperature for nylon. Nylon may be used as the substrate film and may be used as the laminate film if the nylon film chosen is sufficiently transparent to allow enough UV energy to reach the adhesive to cure it. (If a UV opaque nylon film is to be used as the laminate, then a dry lamination process (described below) may be used in lieu of a wet lamination process.

Use of UV Opaque Laminate Film.

Electronic Beam

When something is said to be opaque, it needs to be understood as opaque to something in particular as some materials are opaque to certain forms of energy but relatively transparent to other forms of energy. Opaque and transparent are not binary states but zones on a continuum. Something is opaque for purposes of this application when it is impractical to use a given form of energy to penetrate past a material in a commercial process. In many instances at least some energy makes it across. Likewise, transparent for purposes of this application does not necessarily mean that 100 percent of the energy passes through the material, but rather than enough energy passes through the material so that the energy can be delivered across the material and used in a commercial process. What is transparent at a very low line speed may be effectively opaque at a line speed an order of magnitude faster.

Materials that are opaque to UV energy such that they cannot be used in the wet lamination process shown in FIG. 2 may be used a process that looks very much the same with the substitution of an electronic beam (EB) in place of UV curing stage 416 as the electronic beam energy passes through material that would be opaque to UV energy. Whereas the energy level of a UV radiation may be in the vicinity of 3 electron volts, the energy level of EB radiation may be in the vicinity of 300,000 electron volts. As the energy provided by the EB unit is so high, the temperature of the film does not need to be elevated to be in proximity with the heat distortion temperature and secondary heating is not required. EB units are relatively expensive to purchase and use large amounts of energy so that the use of a UV curing stage is often preferred. Because of the tremendous ability of the EB units to cure the adhesive and the fact that the EB process does not heat the adhesive in the same way that UV curing does, there is less ability to manipulate the EB process to provide gradations of bond strength but this should be altered as the EB equipment becomes capable of fine adjustments to beam strength.

Dry Lamination

When the laminate film 208 is opaque to UV energy, an option that does not require an expensive electronic beam is the use of a UV curing station before the laminate film is applied to the substrate film. If print stations 224 and 228 continue to be used for ink, then a UV curing stage (not shown) would be added between print station 232 and wet lamination nip 412 (in this context simply lamination nip) to partially cure the adhesive so that it is tacky rather than wet. The adhesive would be chosen so that once the curing process is initiated, that it continues. The curing process may take 24 hours or longer for the bond to reach maximum strength). The adhesive may be a 2-part catalyzed adhesive.

While dry lamination could be used in situations where wet lamination would be possible, dry lamination may be used in situations where UV curing with wet lamination would not work well. For example, the 2-part catalyzed adhesive may be used for bonding opaque polyethylene films, such as for shipping envelopes or for bonding two different film types to each other, such as polyester (PET) to polyethylene (LLDPE or LDPE) but not limited to these materials. The adhesives also can bond materials such as paperboard used for stiffer envelopes or folding cartons to thin clear films such as oriented polypropylene (OPP) or biaxially oriented polypropylene (BOPP) or polyester (PET).

A suitable adhesive for some materials including opaque versions of Bemis LLDPE film resin code 26X847, a monolayer, metallocene linear low density polyethylene (LLDPE) film is 10PSLVAB a two component adhesive available from Rad-Cure. The adhesive is described in more detail in Table A. The Bemis film is described in more detail in Table B.

TABLE A

RAD-CURE 10PSLVA,B
UV FLEXO LAMINATING ADHESIVE 2 COMPONENTS
Typical Properties:

| | |
|---|---|
| Brookfield Viscosity | 100 cps @ 77° F. |
| Density | 8.7 lbs/gal |
| Odor | Characteristic, acrylate |
| Appearance | Clear straw color liquid |
| Solids content | 100% |
| Cure Speed | 200 FT/MIN with 1 × 300 watt/in lamps |

TABLE A-continued

RAD-CURE 10PSLVA,B
UV FLEXO LAMINATING ADHESIVE 2 COMPONENTS
Typical Properties:

| | |
|---|---|
| Coverage | 8000 FT/GAL @ 0.2 mil thickness |
| Cure Absorbance Energy | 40 mJ/cm$^2$ |
| Mix Ratio | 7 parts A to 1 Part B |

DESCRIPTION:
RAD-CURE 10PSLVA,B is a UV curable, flexo adhesive for laminating two opaque films. This two component adhesive has excellent adhesion to a wide variety of films and can be used for laminating reverse printed film to white or metallized film. The adhesive is applied to either film and then UV cured at high speeds, The adhesive exits the UV lamps in a hot tacky, pressure sensitive state and is then nipped in contact with the second film. The tacky adhesive has excellent flowout and wetting. The adhesive initial bond is pressure sensitive, and then hardens and post cures to provide a high strength bond. Post cure may take 2-48 hours depending on the application. This product has excellent adhesion to both films and paper. It is essential that potential end users determine suitability of this product by testing under their own process, storage and shipping conditions.
APPLICATION SUGGESTIONS:
A coating thickness of approximately 0.2 to 0.5 mil is recommended. A typical anilox in the 150-200Q range should provide the appropriate coat weight. Best results will be achieved on smooth films and some papers. Excellent results have been obtained with PE and PP films. Film surface treatment to 40-45 dynes/cm is recommended to improve adhesion with low surface energy films.
STORAGE AND HANDLING
The product requires mixing the two components prior to use. After mixing the pot-life is 6-8 hours at room temperature. The viscosity will increase overnight affecting flowout and print quality. The shelf-life is good in the unmixed state when stored away from heat and protected from UV light exposure. The material is combustible and should not be used near open flame. Store below 90° F. Best when used within three months of product Lot No. date on label. Storage longer than six months not recommended. We recommend the use of n-propyl acetate, MEK or denatured ethyl alcohol as clean-up solvents. Use with adequate ventilation. Chemical gloves and safety goggles must be worn when handling this product. Wash thoroughly after handling. This product contains acrylate monomer and proper handling procedures must be used. Consult MSDS prior to use.
DISCLAIMER:
The information and data contained herein are believed to be accurate and reliable; however, it is the user's responsibility to determine suitability of use. Since Rad-Cure cannot know all of the uses to which its products may be put, or the conditions of use, it makes no warranties concerning the fitness or suitability of its products for a particular use or purpose. You should thoroughly test any proposed use of our products and independently conclude satisfactory performance in your application. Likewise, if the manner in which our products are used requires government approval or clearance you must obtain it. Rad-Cure warrants only that its products will meet its specifications. There is no warranty of merchantability or fitness for use, nor any other express or implied warranty. The user's exclusive remedy and Rad-Cure's sole liability is limited to refund of the purchase price or replacement of any product shown to be otherwise than as warranted. Rad-Cure will not be liable for incidental or consequential damages of any kind. Suggestions of uses should not be taken as inducements to infringe any patents. © Copyright 1999 RAD-CURE Corporation

TABLE B

POLYETHYLENE PACKAGING DIVISION
BEMIS COMPANY, INC.
LLDDPE PACKAGING FILM
RESIN CODE 26 × 847
26 × 847 is a monolayer metallocene linear low density (LLDPE) blend film designed for packaging applications requiring medium slip, excellent strength properties, and flex crack resistance at sub zero storage conditions.

| TYPICAL PROPERTIES - 2.00 mil. | | Target | Range | ASTM |
|---|---|---|---|---|
| Gauge (mil.) | | 2.00 | 1.8-2.2 | D374 |
| Density (gm/cc) | | .914 | .912-.936 | D1505 |
| Melt Index (g/10 min.) | | 1.2 | 1.0-1.4 | D1238 |
| Haze (%) | | 11 | 9-13 | D1003 |
| Gloss (45°) | | 65 | 60-70 | D2457 |
| COF | | 0.3 | 0.2-0.4 | D1894 |
| Tensile Ultimate (psi) | MD | 5000 | 4500-5500 | D882 |
| | CD | 5000 | 4500-5500 | |
| Elongation at Break (%) | MD | 500 | 400-600 | D882 |
| | CD | 500 | 400-600 | |
| 2% Secant Modulus (psi) | MD | 18,000 | 16-20,000 | D882 |
| | CD | 21,000 | 19-23,000 | |
| Tear Resistance (g/sheet) | MD | 600 | 550-700 | D1992 |
| | CD | 900 | 700-1100 | |

The basic information is to the best of our knowledge reliable as of the date compiled. No representation, warranty or guarantee is made as to accuracy or completeness. We do not accept liability for any loss or damage that may occur from the use of this documentation as it is user's responsibility to satisfy himself for his own particular use.

Many of the concepts described above in connection with wet lamination apply to dry lamination. Many films will benefit from having from pretreatment to make the film surface more wettable. The bonds in many applications will be stronger if the combination of heat from the common impression cylinder 220 and the chemical reaction of the curing adhesive bring the temperature of the adhesive to approaching the heat distortion temperature for the film. As before the temperature of the adhesive trace will be partially a function of the coating weight and width of the adhesive trace. The coating weight may be altered using halftone printing of the adhesive as described above as the pre-nip curing is only partial and the adhesive will move during the nip to assume the reduced coating weight.

As much of the curing in a dry lamination process occurs after the bonded film is re-wound onto a roll, the bonds will be stronger if the curing process can continue while on the roll at a temperature just below the heat distortion temperature for the film (or the lower of the two heat distortion temperature for a pair of dissimilar films).

Hybrid Products

As mentioned above, there are advantages to creating a set of factory bonds with the high-speed printing of adhesive patterns as described above and then shipping the rolls of products to the point of use where the product is filled and then heat sealed by the user (user bond) using legacy heat seal equipment to complete the sealing of the product. Thus, there is an advantage in producing an adhesive bond, that can withstand a subsequent heat seal step that may include a portion of the adhesive bond.

Strong adhesive bonds created in the manner described above may be used in hybrid products as the addition of a subsequent heat seal bond will not decrease the quality of the adhesive bond such that the bond is no longer a hermetic seal or markedly degrades the capacity of the bond to resist failure.

Materials

Characteristics of RAD-CURE K6010 are provided below as this is an example of an UV Curable Laminating Adhesive that may be used in connection with some implementations of wet lamination. One of skill in the art could obtain other adhesives that have similar properties as a starting point for other implementations of this invention. Adjustments may need to be made, such as to the amount of solids, to adjust the adhesive for use with the specific film being used and the equipment selected for use. Minor adjustments to the adhesive are not uncommon when adjusting a process for high speed production.

RAD-CURE K6010 is a UV curable, flexo type low-odor laminating adhesive for film to film UV wet laminating applications for various types of clear films. The adhesive cures well at fast speeds to provide a durable high quality bond with specific films, such as treated LLDPE, LDPE, and metallocene catalyzed LLDPE, and polypropylene. This product has excellent adhesion to both films and some papers. This product is cationic based and will not cure well in-line over aqueous or solvent amine containing inks.

A coating thickness of approximately 0.2 to 0.5 mil is recommended. A typical anilox in the 150-200 Q range should provide the appropriate coat weight. Best results will be achieved on smooth films and some papers. Excellent results have been obtained with polyethylene and polypropylene films. Film surface treatment to 40-45 dynes/cm is recommended to improve adhesion with low surface energy films. Typical properties are provided in Table C.

TABLE C

Typical Properties for RAD-CURE K6010:

| | |
|---|---|
| Brookfield Viscosity | 700-1000 cps @ 77° F. |
| Density | 8.6 lbs/gal |
| Odor | low |
| Appearance | Clear Liquid |
| Solids content | 100% |
| Cure Speed | 150-200 FT/MIN with 1 × 300 watt/in lamps |
| Coverage | 5300 FT/GAL @ 0.3 mil thickness |
| Cure Absorbance Irradiance | 1.3 Wcm$^2$ |

Alternatives

Other Print Processes.

While the processes set forth above are described in the context of rotary processes as they afford the highest production rates, one of ordinary skill in the art will recognize that the processes set forth above could be implemented in sheet fed processes. The term sheet fed is now understood in the art as including both sheet fed offset and sheet fed silkscreen processes. The silkscreen process is not as fast as the flexographic process, but it is in common use and there is a considerable amount of legacy equipment in place. One advantage of the screen-print process is that it can be used for small runs and it can run one sheet at a time. Sheet fed equipment exists that can work with very large sheets (large format). Thus, very large containers can be printed in custom configurations to create more complicated structures such as an inflatable air mattress. Silkscreen printers can quickly change the screen to accommodate different product layouts.

Printing Modes.

While the process show in connection with FIG. 2 used a rotary flexographic print roller, the process could be implemented with screen print (in either web or sheet fed configurations), or gravure process. Digital processes such as inkjet could be employed to apply the ink and the adhesive.

Products.

The specification does not dwell on the specific products made by the process as the process for creating film bonding using pattern printed adhesive could be used in many contexts including: creating flexible containers ranging from poly bags, to protective packaging products such as air bags for dunnage, void fill, and bubble structures used for surface protection and shock absorption. However, the process could be used in many other contexts including creating air mattresses, create bags, pouches, more complicated items.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

What is claimed is:

1. A process for the high-speed addition of bonded sections to adjacent layers of film; the process comprising:
   applying a pattern of an ultra-violet curable adhesive to a portion of a substrate film;
   placing a laminate film in contact with the substrate film such that the ultra-violet curable adhesive is located between the substrate film and the laminate film, the minimum heat distortion temperature for the pair of films being the lesser of a heat distortion temperature for the substrate film and the heat distortion temperature for the laminate film; and
   exposing the ultra-violet curable adhesive to ultra-violet energy that passes through the laminate film to at least partially cure the ultra-violet curable adhesive at a temperature approaching but below the minimum heat distortion temperature to create a film-tearing bond between the substrate film and the laminate film;
   whereby a pattern of film-tearing bonds is created between the substrate film and the laminate film.

2. The process of claim 1 wherein the laminate film was pretreated to increase wettability of a first side of the laminate film and this first side receives the applied ultra-violet curable adhesive.

3. The process of claim 2 wherein the laminate film receives a first pattern of ink on the first side before the application of the ultra-violet curable adhesive.

4. The process of claim 3 wherein the first pattern of ink is at least partially cured by an application of ultra-violet energy before the application of the ultra-violet curable adhesive.

5. The process of claim 3 wherein the laminate film was pretreated to increase wettability of a second side of the laminate film so that both the first side and the second side were treated and the second side receives a pattern of ink and the first side receives the applied ultra-violet curable adhesive.

6. The process of claim 2 wherein the laminate film was pretreated on the first side to a surface energy of 38 to 44 dynes per centimeter.

7. The process of claim 2 further including supplemental treatment to the first side of the laminate film such that the surface energy of the first side of the laminate film is at least 40 dynes/centimeter.

8. The process of claim 1 wherein the substrate film is put in contact with a common impression cylinder maintained at a temperature above an ambient temperature for air and the step of applying an ultra-violet curable adhesive includes:
   applying a first patterned adhesive trace adapted to reach a temperature approaching but below the minimum heat distortion temperature to create a film-tearing bond; and
   applying a second patterned adhesive trace adapted to reach a temperature below that reached by the first patterned adhesive trace and insufficient to create a film-tearing bond.

9. The process of claim 8 wherein the first patterned adhesive trace is applied with a different coating weight than the second patterned adhesive trace.

10. The process of claim 8 wherein the first patterned adhesive trace is applied using a first coating weight and the second patterned adhesive trace is applied using the same coating weight but using a halftone process so that a post-nip coating weight of the second patterned adhesive trace is less than a post-nip coating weight of the first patterned adhesive trace.

11. The process of claim 8 wherein the first patterned adhesive trace has a first trace width and the second patterned adhesive trace has a second trace width that is less than the first trace width.

12. The process of claim 1 wherein the film-tearing bond is a hermetic seal.

13. The process of claim 12 further including:
   a step of applying a heat seal to bond the substrate film to the laminate film with the heat seal bond is applied across a portion of the substrate film and the laminate film previously bonded together using the ultra-violet curable adhesive such that a hermetic seal exists at the film-tearing bond and at the heat seal bond, including an area of overlap between the adhesive bond and the heat seal bond.

14. The process of claim 1 wherein the process partially cures the ultra-violet curable adhesive at a temperature within 5 degrees Fahrenheit of the minimum heat distortion temperature.

15. The process of claim 1 wherein the process is a wet laminate process and the adhesive is a cationic ultra-violet curable adhesive.

16. The process of claim 1 wherein the process is a dry laminate process and the adhesive is a two part catalyzed free-radical ultra-violet adhesive.

17. The process of claim 1 wherein a pattern of adhesive that partially covers the substrate film is printed onto the substrate film.

18. The process of claim 1 wherein the substrate film is nylon.

19. The process of claim 1 wherein the laminate film is nylon.

20. The process of claim 1 wherein applying the ultra-violet curable adhesive is performed through a rotary printing process.

21. The process of claim 1 wherein applying the ultra-violet curable adhesive is performed through a digital printing process.

22. A process for the addition of bonded sections to adjacent layers of film; the process comprising:
   printing a pattern of an ultra-violet curable adhesive to a portion of a substrate film using a sheet-fed process;
   placing a laminate film in contact with the substrate film such that the ultra-violet curable adhesive is located between the substrate film and the laminate film, the minimum heat distortion temperature for the pair of films being the lesser of a heat distortion temperature for the substrate film and the heat distortion temperature for the laminate film; and
   exposing the ultra-violet curable adhesive to ultra-violet energy that passes through the laminate film to at least partially cure the ultra-violet curable adhesive at a temperature approaching but below the minimum heat distortion temperature to create a film-tearing bond between the substrate film and the laminate film;
   whereby a pattern of film-tearing bonds is created between the substrate film and the laminate film.

* * * * *